United States Patent [19]

Schildt

[11] Patent Number: 4,523,917

[45] Date of Patent: Jun. 18, 1985

[54] VARIABLE PITCH DIAMETER TORQUE SENSING PULLEY ASSEMBLY

[75] Inventor: Walter C. Schildt, Elgin, Ill.

[73] Assignee: Dana Corporation, Toledo, Ohio

[21] Appl. No.: 565,642

[22] Filed: Dec. 27, 1983

[51] Int. Cl.³ .................................... F16H 11/06
[52] U.S. Cl. .................................................. 474/19
[58] Field of Search ........................................ 474/19

[56] References Cited

U.S. PATENT DOCUMENTS

| | | | |
|---|---|---|---|
| 2,276,186 | 3/1942 | Getchell | 74/230.17 |
| 4,173,155 | 11/1979 | Togami et al. | 74/230.17 |
| 4,378,221 | 3/1983 | Huff | 474/19 |

Primary Examiner—James A. Leppink
Assistant Examiner—Frank H. McKenzie, Jr.
Attorney, Agent, or Firm—R. H. Johnson

[57] ABSTRACT

A variable pitch diameter torque sensing pulley assembly which includes a first pulley half with a hub and a second pulley half mounted on the hub for axial and rotational movement. The assembly includes two sets of cams and a set of cam followers for biasing the pulley halves toward each other with a force which varies directly as the torque being transmitted by the pulley assembly varies. The two sets of cams are arranged so that one set of cams transmits torque when the pulley halves are close together and biases the pulley halves toward each other with a relatively small axial force based upon the torque being transmitted and the other set of cams transmits torque when the pulley halves are far apart and biases the pulley halves toward each other with a relatively large axial force based upon the torque being transmitted.

8 Claims, 5 Drawing Figures

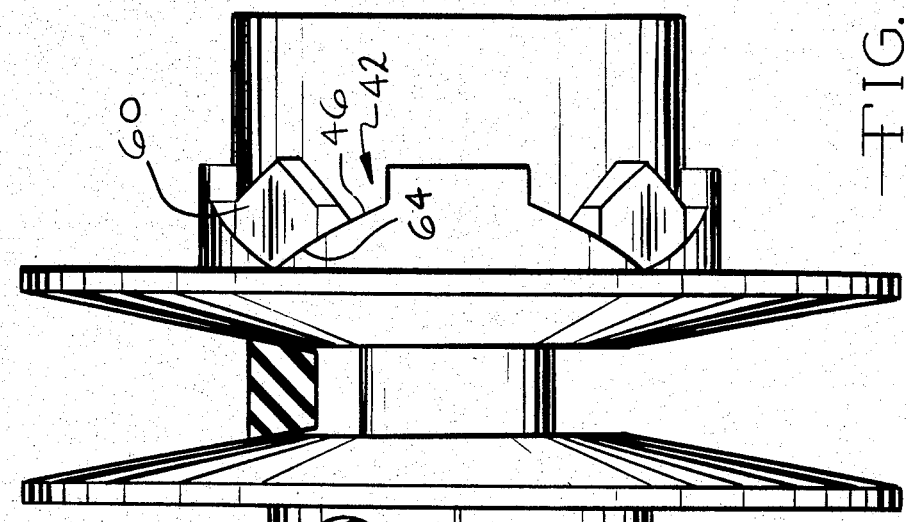
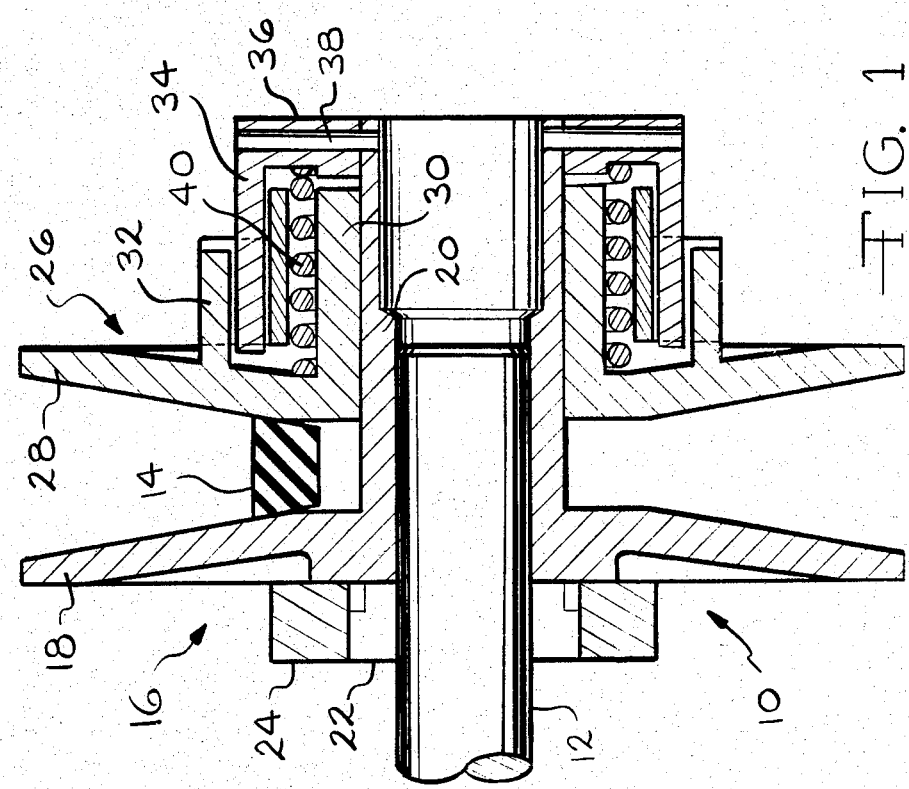

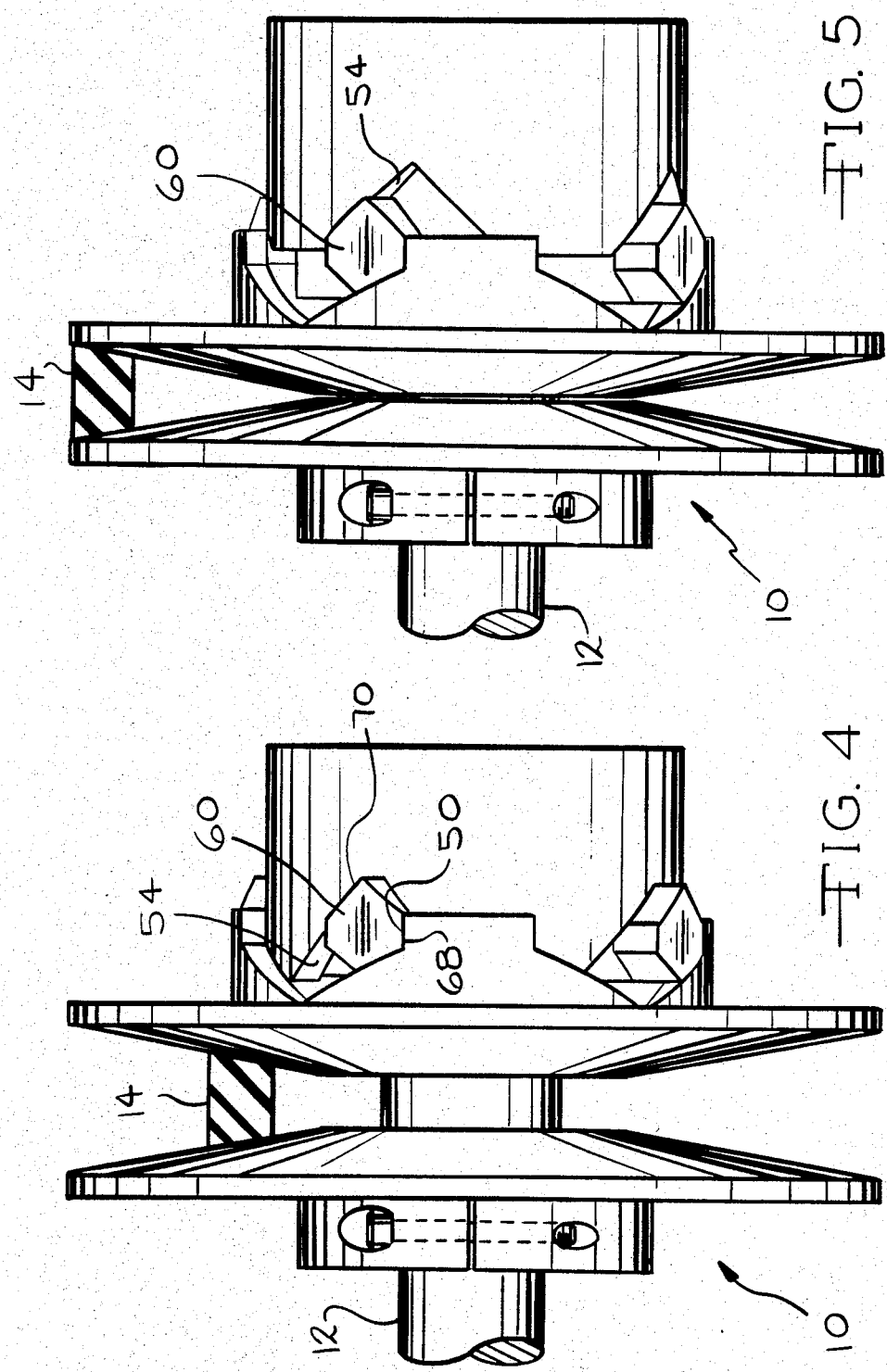

VARIABLE PITCH DIAMETER TORQUE SENSING PULLEY ASSEMBLY

BACKGROUND OF THE INVENTION

This invention relates to belt drives, and more specifically to variable pitch diameter torque sensing pulley assemblies used in V-belt drives.

In both flat belt and V-belt drives, one of the factors which influence the torque which the drive can transmit is belt slippage. That is, relative movement between the belt and the pulley around which it is reeved. Concerning V-belt drives, belt slippage, and hence torque transmission depends upon, inter alia, the axial loading being exerted upon the sides of the V-belt. This presents a problem because as axial loading goes up on a V-belt, its life goes down. In order to solve this problem, belt drives having pulley assemblies which automatically vary the axial loading on the V-belt in response to torque transmission have been developed. In fact, there are even variable pitch diameter torque sensing pulley assemblies which are used in variable speed V-belt drives. An example of such a pulley assembly and drive is shown in U.S. Pat. No. 4,173,155 issued in the name of P. G. Togami et al. on Nov. 6, 1979.

However, pulley assemblies of the single cam set type shown in U.S. Pat. No. 4,173,155 have a shortcoming. In order to accommodate the axial displacement of the pulley halves to provide a variable pitch diameter, the cam surfaces have to be relatively long, especially when the slope of the cam surface is low. As a result, the number of cams in a cam set that can be provided in such a pulley assembly is limited to a small number. This is undesirable because the torque being transmitted by the pulley assembly will have to be transmitted through a small number of cams and cam followers. Also, since the cam surfaces are long, substantial twisting forces will be imposed upon the cam set member due to torque transmission by the pulley assembly.

My improved pulley assembly overcomes the shortcoming described above by providing a cam follower which cooperates with a pair of cam sets with different slopes selected so that when the pulley assembly is adjusted between the minimum and an intermediate pitch diameter, a relatively high axial loading is imposed on the V-belt, and when the pulley assembly is adjusted between the intermediate and the maximum pitch diameter, a relatively low axial loading is imposed upon the V-belt. This not only provides for lower axial loading on the V-belt when the pulley assembly is adjusted for large pitch diameters, but also permits the cam surfaces to be shorter so that more cams can be included in a cam set and lowers the twisting forces on the cam set member due to torque transmission.

BRIEF SUMMARY OF THE INVENTION

This invention relates to a variable pitch diameter torque sensing pulley assembly intended for use in a variable speed V-belt drive. The pulley assembly includes a first pulley half and a second pulley half mounted for axial and rotational movement relative to said first pulley half. A spring biases the pulley halves toward each other with a low axial force which is sufficient to prevent belt slippage only when no torque is being transmitted by the drive. Additional biasing of the pulley halves toward each other is provided by a cam follower and a pair of cam set, the cams of each set having different slopes so that each cam set translates a different proportion of the torque being transmitted by the drive into an axial force biasing the pulley halves toward each other. The pair of cam set and the cam follower are arranged so that when torque is being transmitted, the cam set having cams with the least slope transmits an axial force to bias the pulley halves toward each other when the pulley assembly is adjusted between the minimum pitch diameter and an intermediate pitch diameter and the cam set having cams with the greatest slope transmits an axial force to bias the pulley halves toward each other when the pulley assembly is adjusted between the intermediate pitch diameter and the maximum pitch diameter.

It is a principal object of my invention to provide an improved variable pitch diameter torque sensing pulley assembly which gives longer belt life in a belt drive.

An advantage of my invention is that by using two sets of overlapping cams, the axial length of the pulley assembly is kept to a minimum and the load capacity of the pulley assembly is increased because of the large number of cams that can be provided as compared to a construction utilizing a single set of cams with at least two different slopes.

The above and other objects, features and advantages of my invention will become apparent upon consideration of the detailed description and appended drawing.

BRIEF DESCRIPTION OF THE DRAWING

FIG. 1 is a longitudinal section of my improved variable pitch diameter torque sensing pulley assembly with a V-belt reeved over it at the minimum pitch diameter, FIG. 3 is a side view of the assembly shown in FIG. 1 with a V-belt reeved over it at the minimum pitch diameter, FIG. 4 is similar to FIG. 3, except the V-belt is reeved over the assembly at an intermediate pitch diameter, and FIG. 5 is similar to FIG. 3, except the V-belt is reeved over the assembly at the maximum pitch diameter.

DETAILED DESCRIPTION OF THE PREFERRED EMBODIMENT

Figure 2:
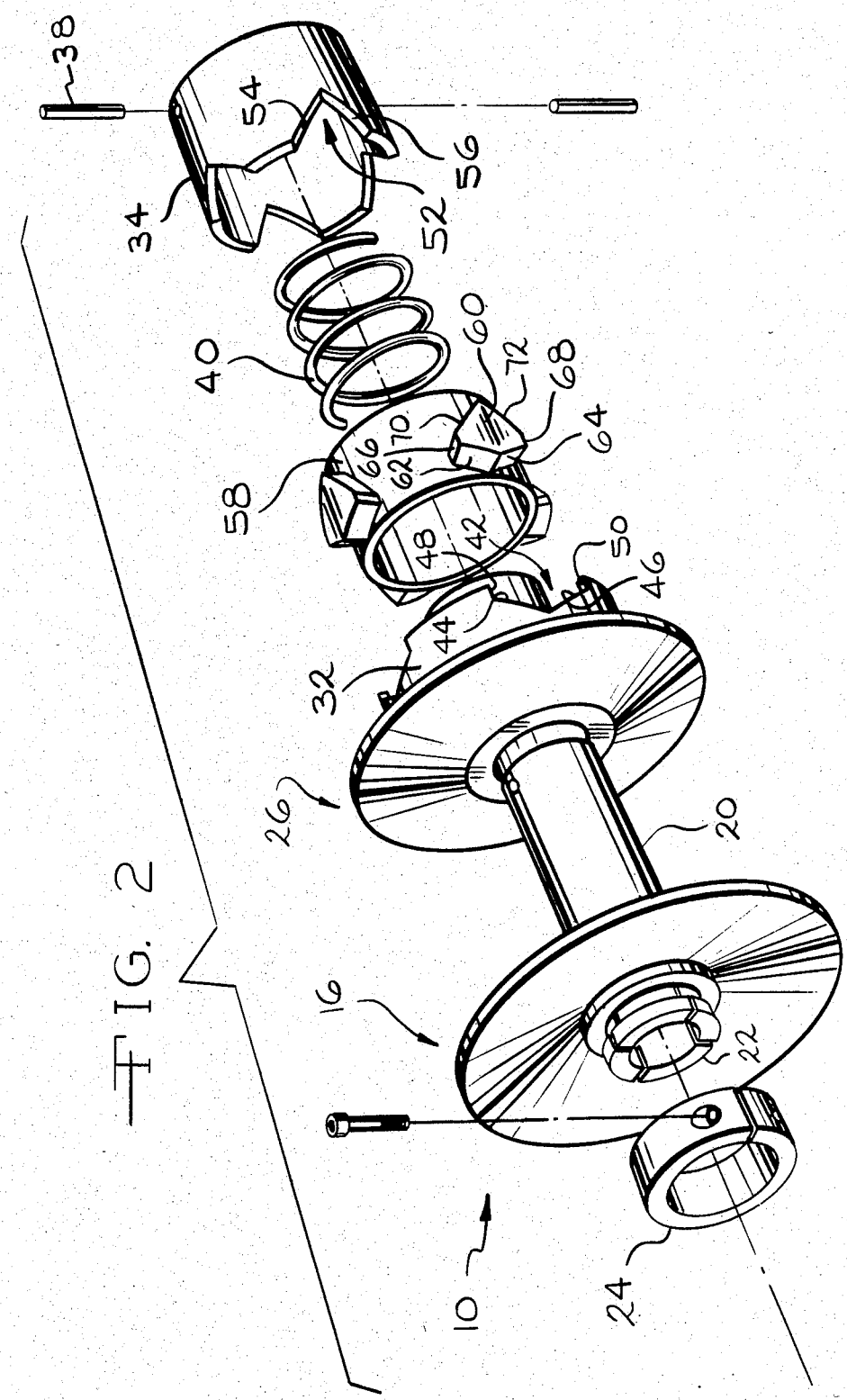
FIG. 2 is an exploded perspective view of the assembly shown in FIG. 1.

Referring to FIGS. 1 and 2, the reference numeral 10 denotes a variable pitch diameter torque sensing pulley assembly which is adapted to be mounted on a rotatable shaft 12. Pulley assembly 10 is intended to form part of a variable speed belt drive which includes a V-belt 14 reeved around pulley assembly 10 and another pulley (not shown). For purposes of this description it will be assumed that shaft 12 is a driving shaft, the other pulley of the belt drive is a fixed pitch diameter pulley and the speed of the belt drive is varied by changing the distance between pulley assembly 10 and the other pulley, thereby causing V-belt 14 to be reeved over pulley assembly 10 at different pitch diameters.

Pulley assembly 10 includes a pulley half 16 which includes a flange 18 and a hub 20. Pulley half 16 is fixed to shaft 12 for rotation with it by means of an integral collet portion 22 over which is placed a collar and screw assembly 24 which when tightened causes collet 22 to clamp pulley half 16 to shaft 12.

A pulley half 26 is carried by pulley half 16 and is mounted on hub 20 for axial and rotational movement relative to pulley half 16. Pulley half 26 includes a flange 28, a hub 30 and an axially extending sleeve 32 which is integral with flange 28.

At this point it will be seen that flanges 18 and 28 are disposed to form a generally outwardly opening V-shaped groove between pulley halves 16 and 26 in which V-belt 14 is reeved.

Disposed in telescopic relationship with sleeve 32 is a sleeve 34 which includes a radially inwardly extending flange 36. Sleeve 34 is fixed to pulley half 16 for conjoint rotation by means of a pair of pins 38 which extend through flange 36 and hub 30. A compression spring 40 is disposed between flange 28 of pulley half 26 and flange 36 which is connected to pulley half 16 so as to bias pulley halves 16 and 26 toward each other.

Sleeve or cam set member 32 has an open end with four equidistantly spaced apart notches 42. Each notch 42 is generally V-shaped and includes a pair of sides or surfaces 44 and 46 which function as cams and have equal and opposite slopes of approximately 30 degrees. Each notch 42 also includes a pair of generally axially extending sides or surfaces 48 and 50.

Sleeve or cam set member 34 has an open end in which equidistantly spaced apart notches 52 are disposed. Each notch 52 has generally a V-shape and includes a pair of sides or surfaces 54 and 56 which function as cams and have equal and opposite slopes. The slopes of sides 54 and 56 are approximately 45 degrees which, as will be noted, is greater than the 30 degree slopes of sides 44 and 46 of notches 48.

It also should be noted that notches 42 and 52 are disposed in overlapping relation so as to define a plurality of generally hexagonal shaped openings.

Disposed generally between the open ends of sleeves 32 and 34 is a ring 58. Integral with ring 58 are four equidistantly spaced radially extending projections 60 which function as cam followers with the sides or surfaces of notches 42 and 52. Each projection has a pair of sides 62 and 64 which mate with sides 44 and 46, respectively, and a pair of sides or surfaces 66 and 68 which mate with sides 48 and 50 respectively, of notches 42. Also, each projection 60 includes a pair of sides or surfaces 70 and 72 which mate respectively with sides 54 and 56 of notches 52.

Referring now also to FIGS. 3 through 5, the operation of my invention will be described. It will be assumed that pulley assembly 10 is fixed to a driving shaft 12 and that pulley assembly 10 is embodied in a variable speed belt drive which includes a V-belt 14 reeved around pulley assembly 10 and another pulley (not shown) which has a fixed pitch diameter so that the speed of the belt drive may be varied by moving pulley assembly 10 closer to or further from the other pulley. Also, it will be assumed that pulley assembly 10 is rotating in a counter-clockwise direction as viewed from the right in FIG. 1.

Assuming that it is desired to run the belt drive at its lowest output speed, assuming a constant speed of rotation for shaft 12, pulley assembly 10 is located an appropriate distance from the other pulley so that pulley halves 16 and 26 are disposed as shown in FIG. 3 whereby belt 14 is reeved over pulley assembly 10 at the minimum pitch diameter. That is, at the minimum distance from the axis of rotation of pulley assembly 10.

Spring 40 biases pulley halves 16 and 26 together so there is an axial loading on the sides of V-belt 14. However, the force of spring 40 has been selected so that the axial loading on the sides of V-belt 14 is not sufficient to prevent slippage between V-belt 14 and pulley halves 16 and 26 when any torque is being transmitted by the belt drive associated with pully assembly 10. When any torque is being transmitted by the belt drive there is a tendency for belt 14 to slip relative to pulley halves 16 and 26 which causes pulley half 26 to tend to rotate relative to pulley half 16, thereby tending to force sides 64 of projections 60 up sides 46 of notches 42. This results in an increased axial loading being imposed on V-belt 14 which is directly proportional to the torque being transmitted by the belt drive. Since the axial loading being imposed on V-belt 14 increases only so long as there is a tendency of the belt to slip, the axial loading is self limiting to the amount just necessary to transmit the torque demand through the belt drive. Further, it will be noted that the axial loading being imposed on V-belt 14 due to the action between sides 46 and 64 is dependent upon their slope, a greater slope providing a smaller axial loading on V-belt 14 for a given torque being transmitted by the drive.

Assuming now that it is desired to increase the output speed of the belt drive, the speed of driving shaft 12 remaining constant, pully assembly 10 will be moved closer to the other pulley of the drive and spring 40 will cause pulley halves 16 and 26 to move closer together, as shown in FIG. 4, so that V-belt 14 remains taut.

When pulley halves 16 and 26 are disposed as shown in FIG. 4, the sides 50 of notches 42 contact the sides 68 of projections 60, thereby stopping any further axial or rotational movement between projections 60 and pulley halves 26 so that effectively projections 60 are locked to pulley half 26. Under this condition, if the torque being transmitted by the belt drive causes belt 14 to start to slip so that pulley half 26 tends to rotate relative to pulley half 16, the torque which now is being transmitted tends to cause sides 70 of projection 60 to move up sides 54 of notches 52 with the result that the axial loading on the sides of V-belt 14 will be increased to the point that belt slippage is stopped. Since the slopes of sides 54 and 70 are greater than the slopes of sides 46 and 64, the proportion of the torque being transmitted which is translated into an axial loading on V-belt 14 will be decreased Finally, if it is desired to set the belt drive at the maximum output speed, pulley assembly 10 is moved toward the other pulley so that in order to keep belt 14 taut, pulley halves 16 and 26 are moved to their closest position relative to each other by spring 40 and belt 14 is moved to its maximum pitch diameter as shown in FIG. 5. The operation of pulley assembly 10 insofar as increasing axial loading on the sides of V-belt 14 in response to an increase in torque transmission through the drive is exactly the same as the situation shown in FIG. 4 since torque transmission through pulley assembly 10 tends to cause projections 60 to move up the sides 54 of notches 52 and projections 60 are blocked from movement up sides 46 of notches 42 due to the contact of sides 50 and 68.

Since notches 42 and 52 are symmetrical, the action of pulley assembly 10 in translating some of the torque being transmitted to an axial loading on the sides of V-belt 14 is identical regardless of the direction of rotation of pulley assembly 10.

It will now be seen that I have provided an improved pulley assembly that provides two different proportions at which torque transmission through the pulley assembly is translated into axial loading on the associated V-belt, depending upon the distance from the axis of rotation of the pully assembly at which the belt is reeved, so that when large torques are transmitted by pulley assembly 10 and belt 14 is reeved toward the maximum pitch diameter of pulley assembly 10, excessive axial loading on the sides of V-belt 14 is avoided.

Further, in providing this improved pulley assembly, a relatively large number of cams can be provided on each cam set member due to the double cam set arrangement, thereby reducing the torque transmitted through each individual cam and cam follower set. Also, the twisting force on the cam set members due to the torque being transmitted through them is reduced because the surfaces or sides of the cams in each cam set can be shorter.

While only a single embodiment of my invention has been described, it will be understood that various modifications can be made to my invention without departing from the spirit and scope of it. Thus, the limits of my invention should be determined from the appended claims as construed in the light of the prior art.

I claim:

1. A variable pitch diameter torque sensing pulley assembly comprising
    a first pulley half including a hub,
    a second pulley half mounted on said hub for axial and rotational movement,
    means operatively connected to said pulley halves for biasing them toward each other,
    first cam means connected to said first pulley half and having a plurality of first sloped surfaces,
    second cam means connected to said second pulley half and having a plurality of second sloped surfaces, the slope of which is different than the slope of said first surfaces,
    cam follower means operable with said first or second cam means for biasing said pulley halves toward each other, and
    means for limiting relative movement between said cam follower means and only the cam means having surfaces with the least slope.

2. A variable pitch diameter torque sensing pulley assembly as set forth in claim 1 wherein said surfaces are disposed in overlapping and facing relationship.

3. A variable pitch diameter torque sensing pulley assembly comprising a first pulley half including a hub,
    a second pulley half mounted on said hub for axial and rotational movement,
    a first sleeve fixed to said hub,
    a second sleeve carried by said second pulley half,
    means operatively connected to said pulley halves for biasing them toward each other,
    first cam means carried by said first sleeve, said first cam means having a plurality of first cam surfaces, each with a first slope,
    second cam means carried by said second sleeve, said second cam means having a plurality of second cam surfaces, each with a second slope different from said first slope,
    cam follower means operable with said first or second cam means to bias said pulley halves toward each other, and
    means for limiting relative movement between said cam follower means and only the cam means having cam surfaces with the least slope.

4. A variable pitch diameter torque sensing pulley assembly as set forth in claim 3 wherein said first sleeve includes a radially inwardly extending flange and said biasing means is a compression spring disposed between said second pulley half and said flange.

5. A variable pitch diameter torque sensing pulley assembly as set forth in claim 3 wherein said sleeves are disposed in telescopic relationship to each other and said first surfaces are disposed in overlapping and facing relationship with said second surfaces.

6. A variable pitch diameter torque sensing pulley assembly as set forth in claim 5 wherein said cam follower means includes a ring and a plurality of projections, each projection engaging one each of said first and second surfaces.

7. A variable pitch diameter torque sensing pulley assembly as set forth in claim 6 wherein said first cam means is a plurality of notches in said first sleeve and said second cam means is a plurality of notches in said second sleeve.

8. A variable pitch diameter torque sensing pulley assembly comprising
    a first pulley half including a first hub, said first pulley half being adapted for rotation about an axis,
    a second pulley half mounted on said first hub for axial and rotational movement relative to said axis and said first pulley half,
    a first sleeve fixed to said first hub, said first sleeve including a radially inwardly extending flange and an open end,
    a second sleeve carried by said second pulley half and disposed in telescopic relationship to said first sleeve, said second sleeve including an open end,
    a compression spring disposed between said second pulley half and said flange for biasing said pulley halves toward each other,
    a plurality of first notches in the open end of said first sleeve, each notch having first and second sides with equal and opposite slopes to define a first V-shaped cam,
    a plurality of second notches in the open end of said second sleeve, each of said second notches having third and fourth sides with equal and opposite slopes to define a second V-shaped cam, the slopes of said third and fourth sides being less than the slopes of said first and second sides,
    each of said second notches also including fifth and sixth sides which extend axially from said third and fourth sides, respectively,
    said first and second notches being disposed in overlapping and facing relationship to define a plurality of openings, and
    a cam follower including a ring and a plurality of radially outwardly extending projections carried by said ring, said cam follower being disposed so that each projection extends through a different one of said openings, each projection having a hexagonal shape with sides which mate respectively with said first through sixth sides.

* * * * *